United States Patent
Borst et al.

(10) Patent No.: US 8,949,161 B2
(45) Date of Patent: Feb. 3, 2015

(54) CACHE MANAGEMENT SYSTEM AND METHOD AND CONTENT DISTRIBUTION SYSTEM INCORPORATING THE SAME

(75) Inventors: Simon C. Borst, Convent Station, NJ (US); James R. Ensor, Middletown, NJ (US); Volker F. Hilt, Middletown, NJ (US); Markus A. Hofmann, Fair Haven, NJ (US); Ivica Rimac, Tinton Falls, NJ (US); Anwar I. Walid, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1289 days.

(21) Appl. No.: 12/210,158

(22) Filed: Sep. 12, 2008

(65) Prior Publication Data

US 2010/0070700 A1    Mar. 18, 2010

(51) Int. Cl.
*G06F 17/00* (2006.01)
*G06F 17/30* (2006.01)

(52) U.S. Cl.
CPC .................... *G06F 17/3048* (2013.01)
USPC .............................. 706/45; 725/93

(58) Field of Classification Search
CPC ................................. H04N 21/2183
See application file for complete search history.

(56) References Cited

U.S. PATENT DOCUMENTS

| | | | | |
|---|---|---|---|---|
| 6,021,403 A * | 2/2000 | Horvitz et al. | | 706/45 |
| 6,766,422 B2 * | 7/2004 | Beyda | | 711/137 |
| 7,028,096 B1 * | 4/2006 | Lee | | 709/231 |
| 7,167,895 B1 * | 1/2007 | Connelly | | 709/203 |
| 7,254,588 B2 * | 8/2007 | Sung et al. | | 1/1 |
| 7,328,250 B2 * | 2/2008 | Wang | | 709/207 |
| 2002/0092026 A1 * | 7/2002 | Janniello et al. | | 725/86 |
| 2002/0162118 A1 * | 10/2002 | Levy et al. | | 725/110 |
| 2005/0193414 A1 * | 9/2005 | Horvitz et al. | | 725/46 |
| 2008/0154887 A1 * | 6/2008 | Ryan et al. | | 707/5 |
| 2010/0070700 A1 * | 3/2010 | Borst et al. | | 711/113 |

* cited by examiner

*Primary Examiner* — Jeffrey A Gaffin
*Assistant Examiner* — David H Kim
(74) *Attorney, Agent, or Firm* — Hitt Gaines, PC

(57) ABSTRACT

A cache management system and method and a content distribution system. In one embodiment, the cache management system includes: (1) a content request receiver configured to receive content requests, (2) a popularity lifetime prediction modeler coupled to the content request receiver and configured to generate popularity lifetime prediction models for content that can be cached based on at least some of the content requests, (3) a database coupled to the popularity lifetime prediction modeler and configured to contain the popularity lifetime prediction models and (4) a popularity lifetime prediction model matcher coupled to the content request receiver and the database and configured to match at least one content request to the popularity lifetime prediction models and control a cache based thereon.

17 Claims, 7 Drawing Sheets

CACHE MANAGEMENT SYSTEM AND METHOD AND CONTENT DISTRIBUTION SYSTEM INCORPORATING THE SAME

TECHNICAL FIELD OF THE INVENTION

The invention is directed to a cache management system and method.

BACKGROUND OF THE INVENTION

Several techniques exist for managing data caches. These techniques track requests for data from the cache and track which data are within the cache. Techniques use this tracking information to determine whether data are in the cache and, when necessary, to determine which cached data should be removed to make room for new data. These techniques are distinguished primarily by the functions they use to select which data to move into or out of a cache.

Existing techniques use their tracking of data requests to manage cache content. If one can say that such techniques guess which data will be requested in the future, then one must say that these guesses are based on request tracking information. That is, their predictions of future requests are based simply on past requests.

SUMMARY OF THE INVENTION

To address the above-discussed deficiencies of the prior art, the invention provides a cache management system. In one embodiment, the cache management system includes: (1) a content request receiver configured to receive content requests, (2) a popularity lifetime prediction modeler coupled to the content request receiver and configured to generate popularity lifetime prediction models for content that can be cached based on at least some of the content requests, (3) a database coupled to the popularity lifetime prediction modeler and configured to contain the popularity lifetime prediction models and (4) a popularity lifetime prediction model matcher coupled to the content request receiver and the database and configured to match at least one content request to the popularity lifetime prediction models and control a cache based thereon.

Another aspect of the invention provides a cache management method. In one embodiment, the cache management method includes: (1) receiving content requests, (2) generating popularity lifetime prediction models for content that can be cached based on at least some of the content requests, (3) storing the popularity lifetime prediction models in a database and (4) matching at least one content request to the popularity lifetime prediction models and control a cache based thereon.

Yet another aspect of the invention provides a content distribution system. In one embodiment, the content distribution system includes: (1) mass storage, (2) a cache coupled to the mass storage and (3) a cache management system associated with the cache and including: (3a) a content request receiver configured to receive content requests, (3b) a popularity lifetime prediction modeler coupled to the content request receiver and configured to generate popularity lifetime prediction models for content contained in the mass storage based on at least some of the content requests, (3c) a database coupled to the popularity lifetime prediction modeler and configured to contain the popularity lifetime prediction models and (3d) a popularity lifetime prediction model matcher coupled to the content request receiver and the database and configured to match at least one content request to the popularity lifetime prediction models and control the cache based thereon.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
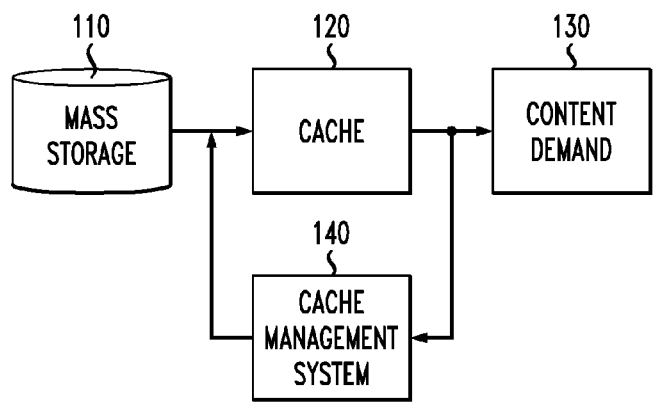
FIG. 1 is a high-level block diagram of a content distribution system that forms one environment within which a cache management system or method constructed according to the principles of the invention may exist or operate.

FIG. 1 is a high-level block diagram of a content distribution system that forms one environment within which a cache management system or method constructed according to the principles of the invention may exist or operate. The content distribution system is, in general, tasked with providing content, e.g., audio, video or other data, that a provider wishes to provide to users in response to content requests. If the content distribution system provides audio content, it may take the form of a jukebox or automated music distribution system. If the content distribution system provides video content, it may take the form of a video-on-demand system.

The content distribution system includes mass storage 110, which may take the form of an array of disk drives, configured to store content. The mass storage 110 is assumed to be of sufficient capacity to contain all content that can possibly be provided to users. A cache 120 is architecturally located between the mass storage 110 and content demand 130. As is true with caches in general, the cache 120 is capable of responding to content requests faster than the mass storage 110. However, it is assumed that the cache 120 is more expensive per unit of storage (e.g., terabyte) and therefore of substantially less capacity than the mass storage 110.

The cache 120 can fulfill content demand 130 to the extent that the cache 120 already contains requested content. The mass storage 110 must fulfill content demand 130 to the extent that the cache 120 does not already contain requested content. In the latter case, the cache 120 is typically updated with the requested content as it is retrieved from the mass storage 110. Updating the cache 120 makes the requested content more readily available for at least near-term future content requests. Fulfilling content requests with the cache 120 is typically far faster than fulfilling content requests with the mass storage 110, so it is beneficial to manage the cache 120 to increase the likelihood that it already contains requested content when a request for it is received. A cache management system 140 is provided to perform this function.

The cache management system 140 is responsible for determining the optimal subset of content that the cache 120 should store, often continually loading content into the cache 120 and replacing content that had previously been loaded into the cache 120. Conventional cache management systems base their determinations on the timing or number of past content requests. Some cache management systems cache content that has been most recently requested. Other cache management systems cache content that has been most often demanded. Still other cache management systems cache content based on some combination of demand recency or demand frequency. Unfortunately, these conventional cache management systems are reactive by their nature; they adjust cache content only in response to past content requests with the expectation that future content requests will bear some relationship to the past requests. Unfortunately, the popularity statistics of future and past requests may not be identical, but are time-varying in a certain fashion. This has been found particularly to be the case when the content in question includes newly-introduced content, such as feature motion pictures or music, or existing ("library") content in which popularity has been temporarily revived by means of a promotion or recommendation. As a result, reactive cache management systems prove undesirable.

In contrast to the conventional reactive cache management systems described above, the invention provides, among other things various embodiments of cache management systems and methods that are capable of predicting future content requests and adjusting cached content based on: (1) one or more explicit stimuli for future content popularity, (2) one or more models of popularity lifetime or (3) both of one or more explicit stimuli for future content popularity and one or more models of popularity lifetime. Various embodiments of the systems and methods described herein may be employed to select appropriate explicit stimuli for future content popularity, generate appropriate models of popularity lifetime, seed content in a cache, control cache data updates (replacements), and transmit content to or from a cache. The general goals of various embodiments of the cache management system are to cache content to increase and perhaps maximize future content request rate and to cache content based on relevant explicit stimuli.

Before describing certain of the embodiments in detail, some general aspects of demand characteristics will be described to lay a foundation for understanding the certain embodiments. FIGS. 2A-D are graphs respectively illustrating various demand characteristics. They serve as examples of the popularity lifetime of a content item.

It has been found that a relatively small set of distinct patterns describes the popularity of various content items over their lifetime. Patterns can be modified by defining values for their anchor points. Patterns can be assigned to a content item it two ways: (1) assignment by provider, e.g., based on experience, market data or marketing efforts (e.g., "The Pirates of the Caribbean") or (2) automatic assignment by tracking popularity over an initial period of time.

A provider can actively influence the popularity of a content item through, for example, recommender systems or marketing events (e.g., a "Casablanca weekend"). However, it has also been found that not all events are significant. For example, an Oscar® nomination has been found to have little or no immediate impact on popularity. This influence can be reflected in the popularity lifetime by creating insertions that modify the standard pattern. The cache management system may monitor actual popularity and make adjustments, e.g., by modifying anchor points or changing a pattern.

Figure 2A:
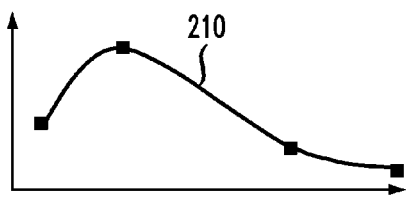
FIGS. 2A-D are graphs respectively illustrating demand characteristics for an addition of new content, existing content, a response to a change in popularity, e.g., a promotion, for library content and aggregate demand for new and existing content.

FIG. 2A shows a pattern 210 representing a demand characteristic for an addition of new content (e.g., a "blockbuster" title). The pattern 210 results from anchor points representing requests for a particular piece of new content (a new content item) taken over a period of time, e.g., several weeks. The pattern 210 exhibits a relatively sharp rise in demand as awareness of and interest in the content item spreads among users. A peak demand occurs at some point in time after introduction. Following the peak is a gradual decline to a more-or-less steady request rate. The new content may at this time be regarded as existing content, i.e., a library title.

Figure 2C:
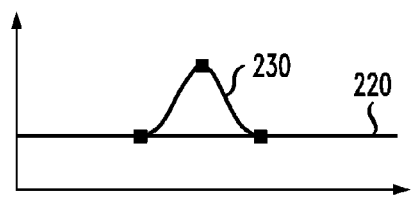
Figure 2B:
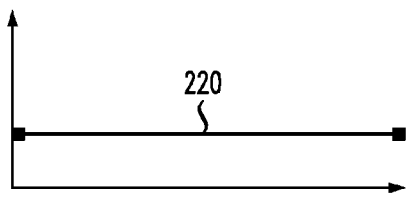

FIG. 2B illustrates a pattern 220 representing a demand characteristic for existing (i.e., "library") content. Like the pattern 210 of FIG. 2A, the pattern 220 results from anchor points representing requests for an existing content item taken over a period of time. Unlike the pattern 210 of FIG. 2A, the pattern 220 is substantially flat, representing a more-or-less steady request rate.

FIG. 2C illustrates an insertion 230 representing a demand characteristic for a response to any change in popularity, e.g., a promotion, for library content. The insertion 230 interrupts the pattern 220, indicating that any change in popularity has occurred with respect to the existing content. However, the change is usually temporary; popularity typically eventually returns to or near its pre-promotion or recommendation popularity. Various examples of explicit stimuli that trigger changes in popularity meriting an insertion include notifications of upcoming content availability (e.g., a movie will be released at a specified time), notifications of upcoming promotions of content (e.g., a Humphrey Bogart film festival), notifications of related events (e.g., Oscar® awards), or explicit assertions/characterizations about content (e.g., favorable reviews).

Figure 2D:
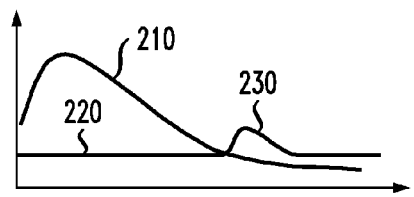

FIG. 2D illustrates aggregate demand for new and existing content. FIG. 2D illustrates the principle that library content (represented by the pattern 220 as modified by the insertion 230) may occasionally be more popular than new content (represented by the pattern 210). Thus, a cache management system should be capable of accommodating changes in relative popularity irrespective of the age of the content items involved.

Figure 3A:
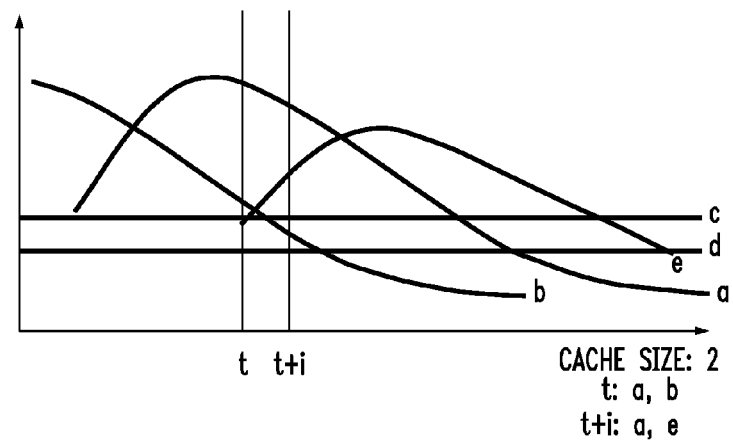
FIGS. 3A-B are graphs conceptually illustrating popularity lifetime that may be employed to optimize caching for future requests.
Figure 3B:
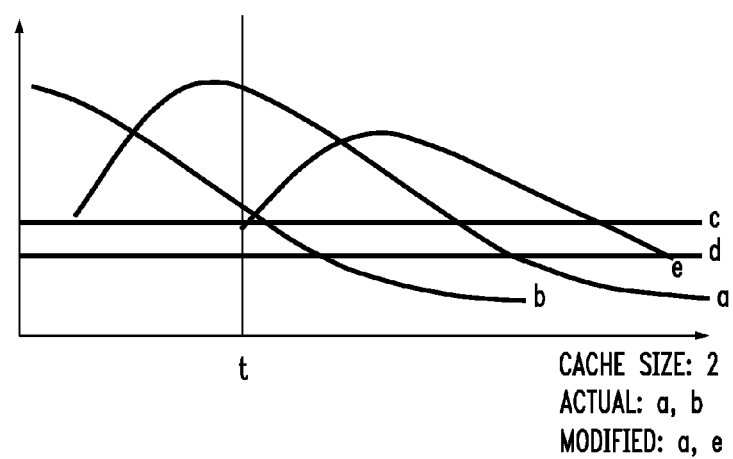

FIGS. 3A-B are graphs conceptually illustrating popularity lifetime that may be employed to optimize caching for future requests. A significant concept underlying the various embodiments described herein is that popularity lifetime may be employed to optimize caching for future content requests. Popularity patterns gleaned from past content requests may be used to model the current and future popularity of each content item, forming the basis for comparisons and caching decisions. Future demand may be anticipated by "looking ahead" in the popularity.

In one embodiment, a cache management system employs a caching technique in which caching is based on a time $t_{i+1}$ instead of a time $t_i$. The issue to be resolved is how large i should be. The prediction for the popularity at time $t_{i+1}$ may be calculated as follows:

$$p_{i+1} = c + p_i * d_i, \quad (1)$$

where $p_0$ is the peak request rate after the content item is added to the mass storage, $d_i$ is a decay factor and c is determined for each content item. The decay factor is time-dependent to model an initial increase followed by a decline. The decay factor, $d_i$, is likely to be constant after the initial peak, e.g., $d_0 = 2$, $d_1 = 1$, and $d_i = 0.8$ for $i > 1$. In one embodiment, values for $d_i$ and c are determined algorithmically based on past requests. In another embodiment, $d_i$ and c are adapted over time based on ongoing content requests.

In another embodiment, a cache management system employs a caching technique in which caching is based on a defined border area (e.g., the least popular x % items in a given cache space). Content items that are increasing in popularity are preferred for caching over content items for which popularity is flat. Likewise, content items for which popularity is flat are preferred for caching over content items that are decreasing in popularity. The issue to be resolved is how large x should be.

Figure 4:
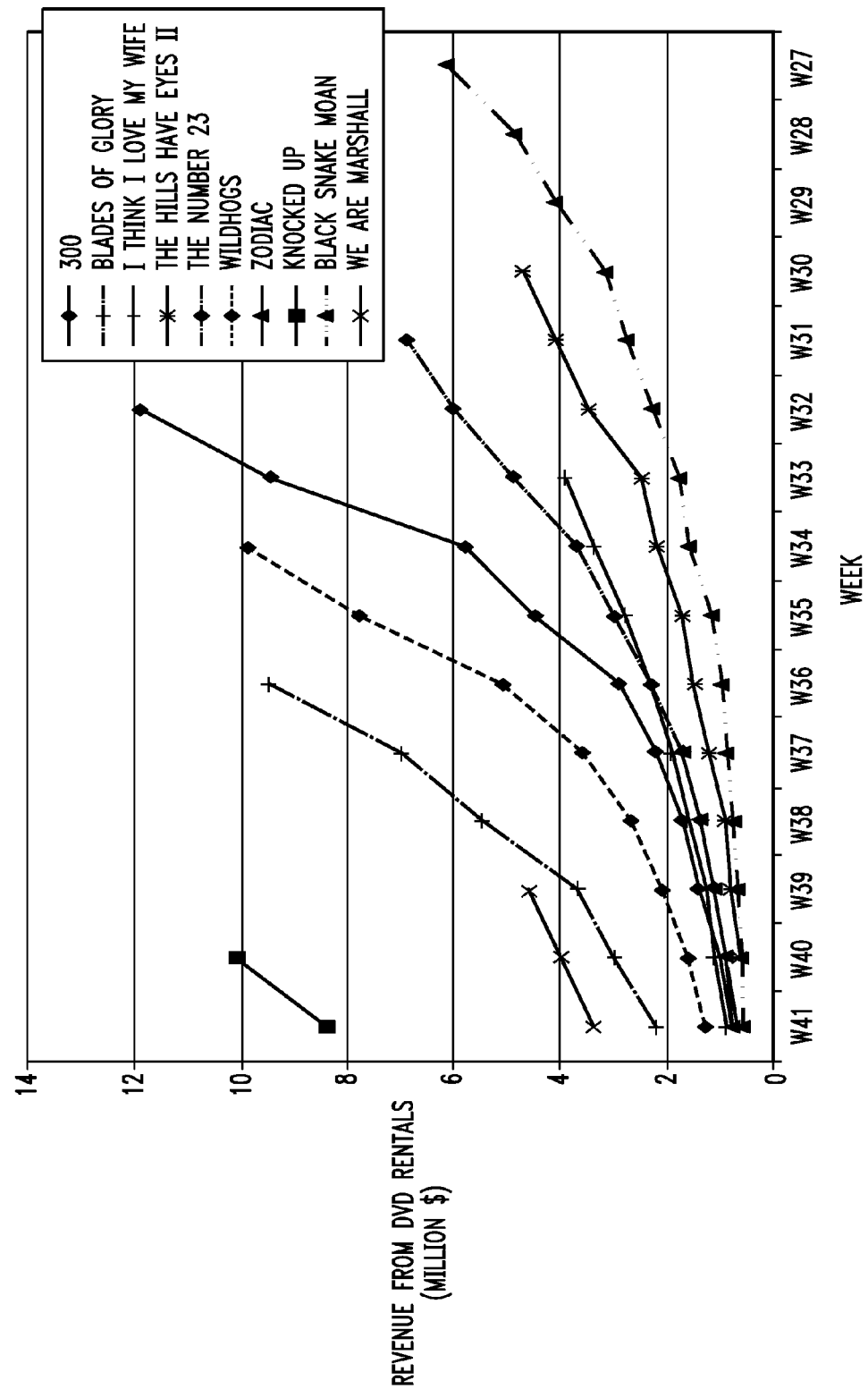
FIG. 4 is a graph illustrating actual popularity in the United States as a function of time for certain example feature motion pictures ("titles")

Prediction-based cache replacement involves caching a changing population. It is based on the observation that the popularity of content changes over its lifetime following a few specific patterns. For example, the popularity of blockbusters follows a geometric decay. FIG. 4 is a graph illustrating actual popularity in the United States as a function of time for certain example titles. It should be noted that time is stated in reverse order, i.e., week 41 ("W41") lies to the left of week 27 ("W27"). The titles in question were commercially distributed in the U.S. during 2007 and 2008 and include: "300," "Blades of Glory," "I Think I Love My Wife," "The Hills Have Eyes II," "The Number 23," "Wild Hogs," "Zodiac," "Knocked Up," "Black Snake Moan" and "We Are Marshall." Though the positions and shapes of the curves in the graph of FIG. 4 vary, all exhibit a decrease over time.

Figure 5:
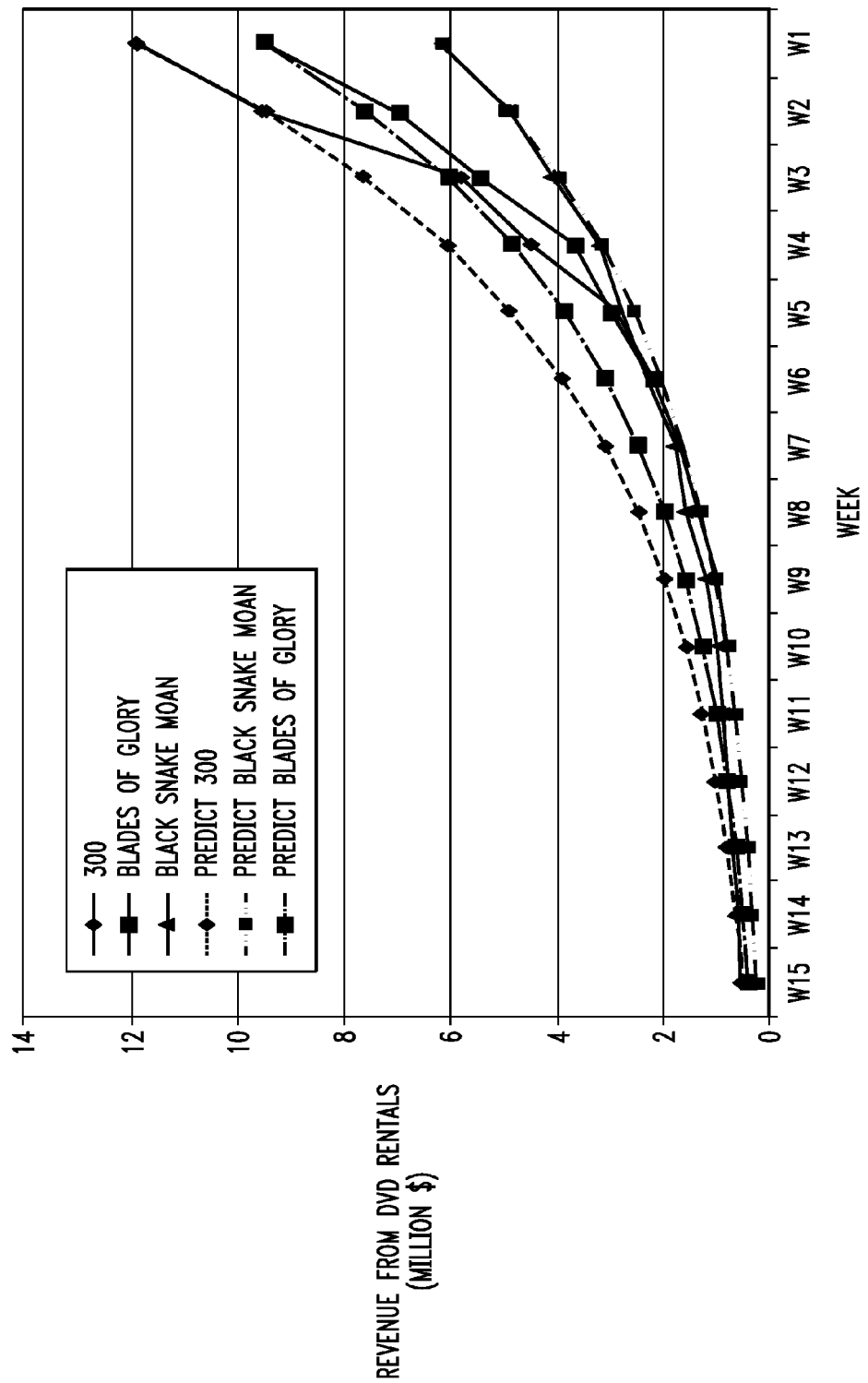
FIG. 5 is a graph illustrating actual and modeled popularity in the United States as a function of time for certain example titles.

FIG. 5 is a graph illustrating actual and modeled popularity in the United States as a function of time for certain example blockbuster titles. Again, time is stated in reverse order, i.e., week 15 ("W15") lies to the left of week 1 ("W1"). Using Equation (1) above, and selecting values for $d_i$ and c, FIG. 5 shows that the modeled popularity curves (e.g., "Predict 300," "Predict Black Snake Moan" and "Predict Blades of Glory") resulting from a popularity lifetime prediction technique closely track the respective actual popularity curves (e.g., "300," "Black Snake Moan" and "Blades of Glory").

Figure 6:
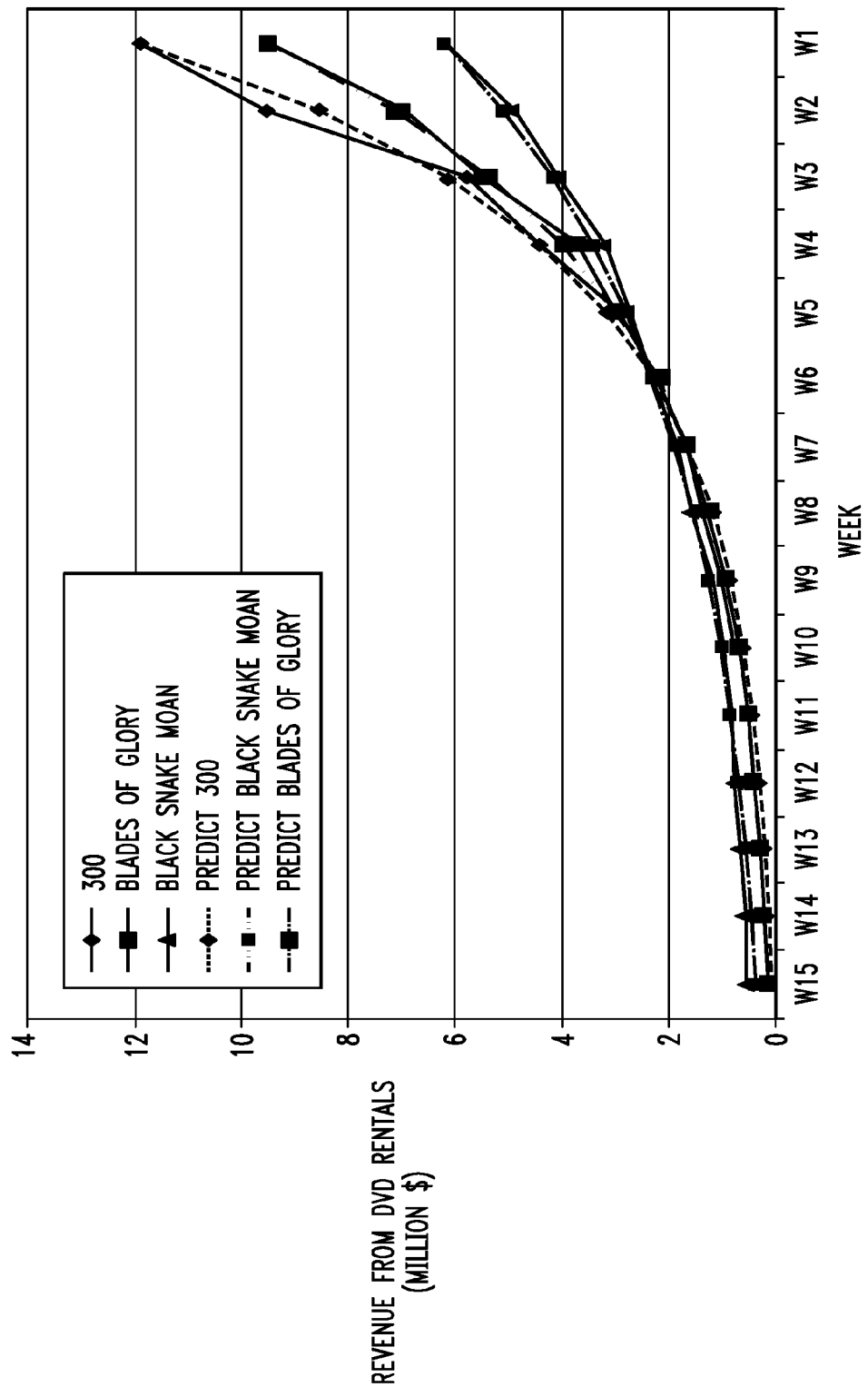
FIG. 6 is a graph illustrating actual and modeled popularity in the United States as a function of time for certain example titles.

The decay factor, $d_i$, may be determined, for example, by examining reviews. One publicly available source that aggregates reviews for titles and presents them on the Internet is Rotten Tomatoes™. Using Rotten Tomatoes™ to form predictions on a per-title basis, $d_i$ may lie between about 0.72 and about 0.86 for individual titles. The average of $d_i$ may be about 0.8. Given this per-title $d_i$, average prediction error may be about 4%. With a global value of $d_i = 0.8$, the average error may be about 18%. FIG. 5 shows predictions for three example titles with a common $d_i = 0.8$. FIG. 6 is a graph illustrating actual and modeled popularity in the United States as a function of time for certain example titles. FIG. 6 shows predictions for the same titles with individual $d_i$ values. Individual $d_i$ values appear to yield more accurate predictions. Therefore, one embodiment employs individual $d_i$ values. An alternative, perhaps less preferred, embodiment uses a common $d_i$ value for all titles.

Two popularity lifetime prediction techniques will be now be described. The first popularity lifetime prediction technique considers an observed popularity to correct the prediction. Observed popularity could be measured, e.g., using a Least Recently/Frequently Used (LRFU) paging technique. Thus, $r_i$=LRFU popularity at time i. This popularity lifetime prediction technique might require a LRFU technique that determines the absolute popularity of titles (i.e., independent of other titles). A distance-based technique may alternatively be used. For example, $r_i = 1/(\text{time}_{last\_access} - \text{time}_{previous\_to\_last\_access})$. The prediction may then be combined with observed popularity using a weighting factor $\alpha$. Combined popularity at time $t_{i+1}$ is therefore:

$$p_{i+1} = (c + p_i * d_i) * \alpha + r_{i+1} * (1-\alpha). \quad (2)$$

Figure 7:
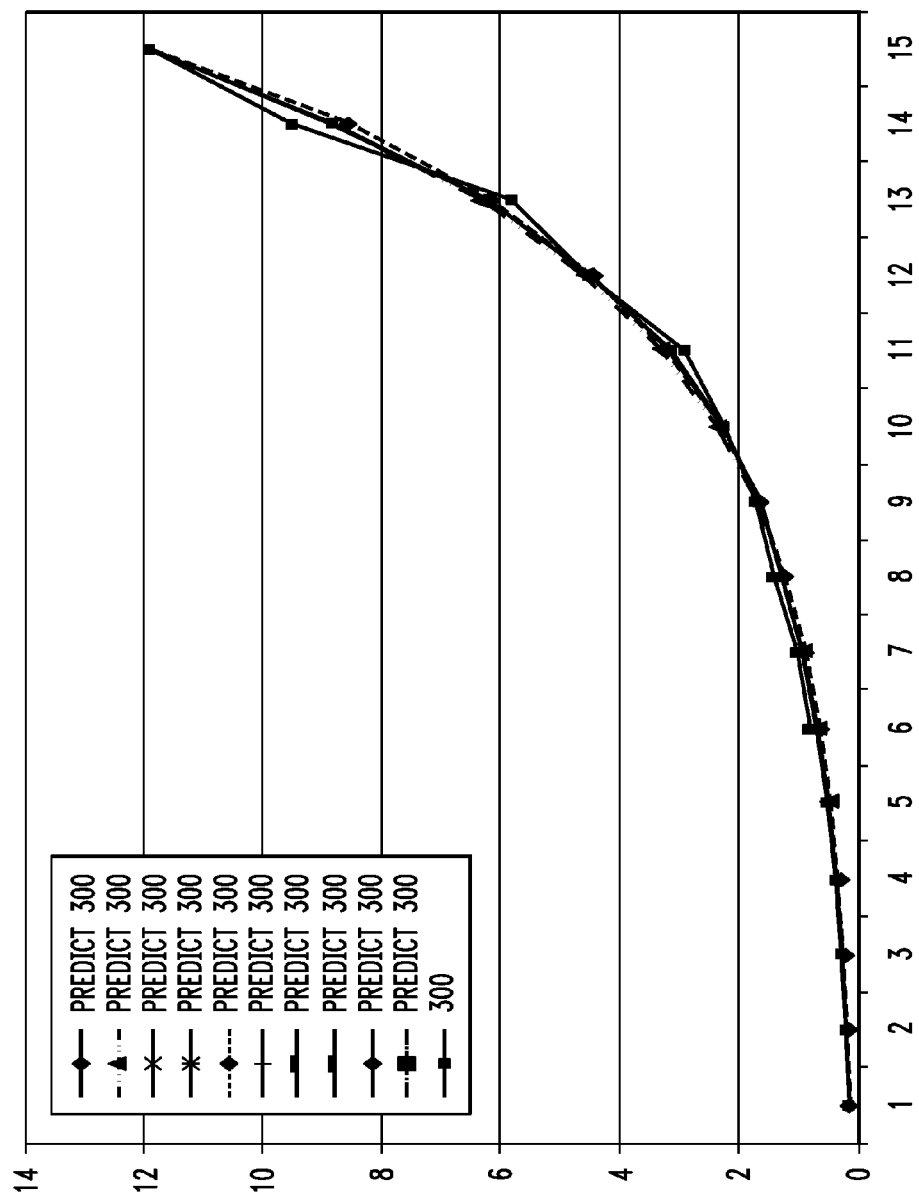
FIG. 7 is a graph comparing various models of popularity in the United States as a function of time for a certain title, namely "300;"

FIG. 7 is a graph comparing various models of popularity in the United States as a function of time for a certain title, namely "300." FIG. 7 shows how the corrected popularity evolves. Note that a constant, optimal per-title $d_i$ is assumed to be known from the start, which is unrealistic.

For cache replacement, a rank may be determined based on the number of times the item will be accessed in the future. The cache rank at time i, $cr_i$, may be determined as follows:

$$cr_i = \sum_{j=0}^{k} p_{i+j}, \quad (3)$$

where k is the length of lookahead window. An item in the cache would typically be replaced if the new item has a higher rank than the item in the cache with the lowest rank.

The second popularity lifetime prediction technique captures the popularity trends. Equations employed in this technique are as follows:

$$L(t) = (1-\theta) * D(t) + \theta * (L(t-1) + T(t-1)), \text{ and} \quad (4)$$

$$T(t) = (1-\beta) * (L(t) - L(t-1)) + \beta * T(t-1), \quad (5)$$

where D is an observation or a measurement and T is a trend (a slope). The technique involves forecasting k periods into future F(t+k):

$$F(t+k) = L(t) + k * T(t). \quad (6)$$

Smoothing parameters $\theta$ and $\beta$ (each between 0 and 1) control the degree of forgetfulness of older measurements.

Figure 8:
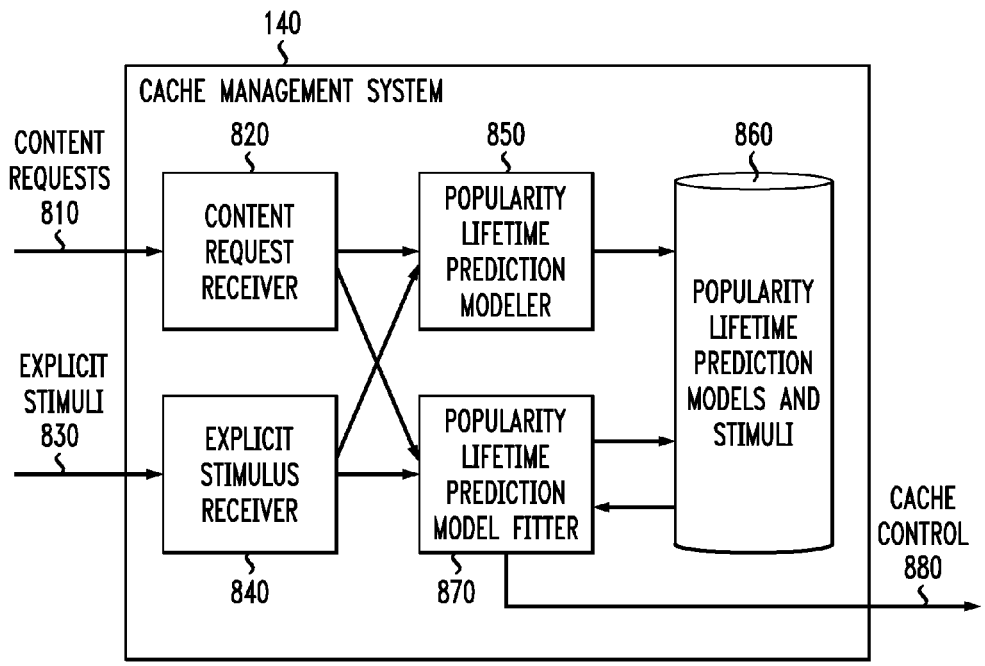
FIG. 8 is a block diagram of one embodiment of a cache management system employing either or both of one or more explicit stimuli for future content popularity and one or more models of popularity lifetime to control caching and constructed according to the principles of the invention.

Having set forth various explicit stimuli and popularity lifetime prediction techniques that may be employed to improve caching, an example of a cache management system will now be set forth. FIG. 8 is a block diagram of one embodiment of a cache management system, generally designated 140, employing either or both of one or more explicit stimuli for future content popularity and one or more models of popularity lifetime to control caching and constructed according to the principles of the invention.

The cache management system 140 is configured to receive content requests 810 into a request receiver 820. The cache management system 140 is further configured to receive explicit stimuli 830 into a stimulus receiver 840. A popularity lifetime prediction modeler 850 is coupled to the request receiver 820 and perhaps also to the stimulus receiver 840 and is configured to generate popularity lifetime prediction models for the content that the mass storage 110 of FIG. 1 is to contain.

In the illustrated embodiment, the popularity lifetime prediction modeler 850 generates a popularity lifetime prediction model for each content item that the mass storage 110 of FIG. 1 is to contain. A database 860 is configured to contain the popularity lifetime prediction models and any stimuli that may be associated therewith. A popularity lifetime prediction model matcher 870 is coupled to either one or both of the request receiver 820 and the stimulus receiver 840 and is configured to employ either content requests, explicit stimuli or both content requests and explicit stimuli to match demand to the popularity lifetime prediction models that are contained in the database 860. The popularity lifetime prediction model matcher 870 is further configured to produce cache control 880, that is, to populate the cache 220 of FIG. 2. Populating the cache may involve seeding the cache with content items before content requests have even been received. Populating the cache may also involve replacing content items in accordance with content requests and resulting model-matching.

The techniques that use predictions of future data requests and input from cache management routines to lower network transmissions of data to and from caches. Similar techniques lower the peak traffic loads or lower the loads on specific network links by scheduling and routing data to and from caches according to predicted values. For example, content that is predicted to be popular but is not yet popular may be loaded into the cache during appropriate times to avoid traffic load spikes.

Figure 9:
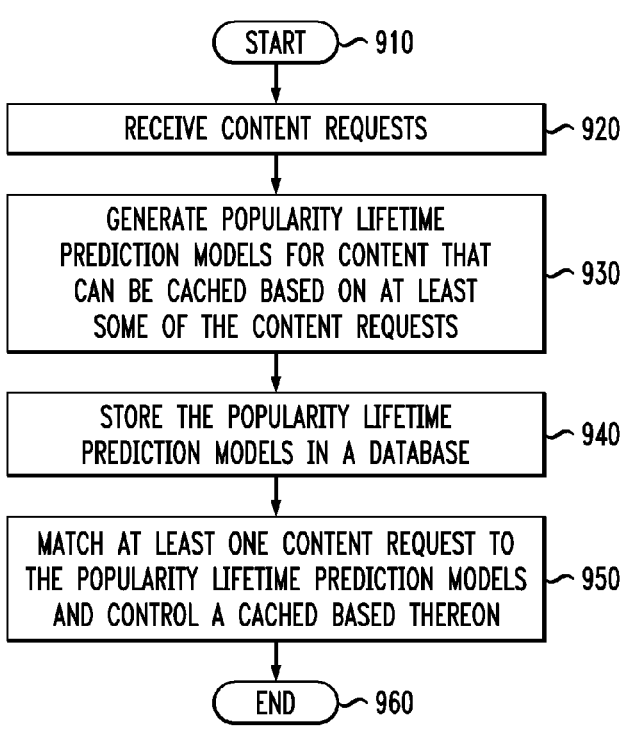
FIG. 9 illustrates a flow diagram of one embodiment of a cache management method carried out according to the principles of the invention.

FIG. 9 illustrates a flow diagram of one embodiment of a cache management method carried out according to the principles of the invention. The method begins in a start step 910. In a step 920, content requests are received. In a step 930, popularity lifetime prediction models are generated for content that can be cached based on at least some of the content requests. The generating may be carried out for each of a plurality of content items or for related content items. The popularity lifetime prediction models may alternatively or additionally be generated based on at least one explicit stimulus. In a step 940, the popularity lifetime prediction models are stored in a database. In a step 950, at least one content request is matched to the popularity lifetime prediction models and control a cache based thereon. The cache may alternatively or additionally be controlled based on at least one explicit stimulus. The method ends in an end step 960.

Those skilled in the art to which the invention relates will appreciate that other and further additions, deletions, substitutions and modifications may be made to the described embodiments without departing from the scope of the invention.

What is claimed is:

1. A cache management system, comprising:
a content request receiver configured to receive requests for a unit of content;
a popularity lifetime prediction modeler configured to generate popularity lifetime prediction models for content that can be cached based on at least some of said requests, wherein at least one of said popularity lifetime prediction models for predicting a future popularity of said unit of content is determined based on a peak rate of requesting said unit of content after an introduction of said unit of content, a decay factor, and a base determined for said unit of content; and
a popularity lifetime prediction model processor configured to associate at least one request for the unit of content with said popularity lifetime prediction models, and to control a cache based on the at least one popularity lifetime prediction model and at least one of the following stimuli:
notification of upcoming content availability, and
notification of upcoming promotions of content.

2. The cache management system as recited in claim 1 wherein said popularity lifetime prediction modeler is further configured to generate said popularity lifetime prediction models based on at least one of said stimuli.

3. The cache management system as recited in claim 1 wherein at least one of said popularity lifetime prediction models include a prediction for a popularity at time $t_{i+1}$ calculated as follows:

$$p_{i+1} = c + p_i * d_i,$$

where $p_0$ is said peak request rate after said content item is added, $d_i$ is said decay factor and $c$ is said base determined for said unit of content.

4. The cache management system as recited in claim 1 wherein said popularity lifetime prediction modeler is configured to generate a popularity lifetime prediction model for each of a plurality of said units of content.

5. The cache management system as recited in claim 1 wherein said stimuli further include an explicit assertion/characterization about said unit of content.

6. The cache management system as recited in claim 1 wherein said unit of content is either a film or song.

7. A cache management method, comprising:
receiving requests for a unit of content;
generating popularity lifetime prediction models for content that can be cached based on at least some of said requests, wherein at least one of said popularity lifetime prediction models for predicting a future popularity of said unit of content is determined based on a peak rate of requesting said unit of content after an introduction of said unit of content, a decay factor, and a base determined for said unit of content; and
associating at least one request for the unit of content with said popularity lifetime prediction models, and controlling a cache based on the at least one popularity lifetime prediction model and at least one of the following stimuli:
notification of upcoming content availability, and
notification of upcoming promotions of content.

8. The cache management method as recited in claim 7 wherein said generating comprises generating said popularity lifetime prediction models based on at least one of said stimuli.

9. The cache management method as recited in claim 7 wherein at least one of said popularity lifetime prediction models include a prediction for a popularity at time $t_{i+1}$ calculated as follows:

$$p_{i+1} = c + p_i * d_i,$$

where $p_0$ is said peak request rate after said content item is added, $d_i$ is said decay factor and $c$ is said base determined for said unit of content.

10. The cache management method as recited in claim 7 wherein said generating is carried out for each of a plurality of said units of content.

11. The cache management method as recited in claim 7 wherein said stimuli further include an
explicit assertion/characterization about said unit of content.

12. The cache management method as recited in claim 7 wherein said cache management method is carried out in a video-on-demand system.

13. A content distribution system, comprising:
mass storage;
a cache coupled to said mass storage; and
a cache management system associated with said cache and including:
a content request receiver configured to receive requests for a unit of content, a popularity lifetime prediction modeler configured to generate popularity lifetime prediction models for content contained in said mass storage based on at least some of said requests, wherein at least one of said popularity lifetime prediction models for predicting a future popularity of said unit of content is determined based on a peak rate of requesting said unit of content after an introduction of said unit of content, a decay factor, and a base determined for said unit of content, and a popularity lifetime prediction model processor configured to associate at least one request for the unit of content with said popularity lifetime prediction models, and to control said cache based on the at least one popularity lifetime prediction model and at least one of the following stimuli:

notification of upcoming content availability, and notification of upcoming promotions of content.

14. The content distribution system as recited in claim 13 wherein said popularity lifetime prediction modeler is further configured to generate said popularity lifetime prediction models based on at least one of said stimuli.

15. The content distribution system as recited in claim 13 wherein at least one of said popularity lifetime prediction models include a prediction for a popularity at time $t_{i+1}$ calculated as follows:

$$p_{i+1} = c + p_i * d_i,$$

where $p_0$ is said peak request rate after said content item is added to said mass storage, $d_i$ is said decay factor and c is said base determined for said unit of content.

16. The content distribution system as recited in claim 13 wherein said popularity lifetime prediction modeler is configured to generate a popularity lifetime prediction model for each of a plurality of said units of content.

17. The content distribution system as recited in claim 13 wherein said stimuli further include an explicit assertion/characterization about said unit of content.

* * * * *